United States Patent
Mihira

(10) Patent No.: US 10,394,507 B2
(45) Date of Patent: Aug. 27, 2019

(54) CONTROL METHOD FOR COMMUNICATION TERMINAL AND STORAGE MEDIUM

(71) Applicant: CANON KABUSHIKI KAISHA, Tokyo (JP)

(72) Inventor: Yoshiro Mihira, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/000,316

(22) Filed: Jun. 5, 2018

(65) Prior Publication Data

US 2018/0364963 A1    Dec. 20, 2018

(30) Foreign Application Priority Data

Jun. 20, 2017  (JP) ................. 2017-120749

(51) Int. Cl.
| | |
|---|---|
| H04N 1/04 | (2006.01) |
| G06F 3/12 | (2006.01) |
| H04L 29/08 | (2006.01) |
| H04N 1/00 | (2006.01) |

(52) U.S. Cl.
CPC .......... *G06F 3/1292* (2013.01); *G06F 3/1208* (2013.01); *G06F 3/1256* (2013.01); *H04L 67/06* (2013.01); *H04N 1/00209* (2013.01); *H04N 1/00413* (2013.01)

(58) Field of Classification Search
CPC ..... G06F 3/1292; G06F 3/1256; H04L 67/06; H04N 1/00209
USPC ....................................................... 358/1.15
See application file for complete search history.

(56) References Cited

U.S. PATENT DOCUMENTS

| | | | | |
|---|---|---|---|---|
| 8,346,903 | B2 * | 1/2013 | Shepherd | G06F 3/1226 |
| | | | | 455/456.6 |
| 2012/0069371 | A1 * | 3/2012 | Fujii | G06F 3/1208 |
| | | | | 358/1.13 |
| 2014/0355047 | A1 * | 12/2014 | Lee | G06F 3/1292 |
| | | | | 358/1.15 |

FOREIGN PATENT DOCUMENTS

| | | |
|---|---|---|
| JP | 2014-174831 A | 9/2014 |
| JP | 2014-235486 A | 12/2014 |

OTHER PUBLICATIONS

"Changing type of Open File Common Dialog Box (Old type/New type)"; https://www.megasoft.co.jp/support/mifes/faq/miw10faq/faq143.html; accessed on Dec. 12, 2018 and machine-translated on Dec. 13, 2018.

(Continued)

*Primary Examiner* — Houshang Safaipour
(74) *Attorney, Agent, or Firm* — Canon U.S.A., Inc., IP Division

(57) ABSTRACT

A selection screen for prompting a user to select a file selection method and including at least first and second display items for selecting a file selection method is displayed. If the first display item is selected, a screen for a file selection function provided by the application is displayed, and a file selected through the screen is determined as a file to be processed. If the second display item is selected, the file selection function provided by the OS is invoked, and a file selected through the file selection screen provided by the OS is determined as a file to be processed. Data based on the file is transmitted to the image processing apparatus.

18 Claims, 14 Drawing Sheets

(56) References Cited

OTHER PUBLICATIONS

"Hidemaru Editor Help (corresponding to Ver. 8.52"; https://web.archive.org/web/20150615235019if_/http://hidemaruo.mydns.jp:81/helpsite/hidemaru/html/070_Env_File.html; accessed on Dec. 13, 2018 and machine-translated on Dec. 13, 2018.

* cited by examiner

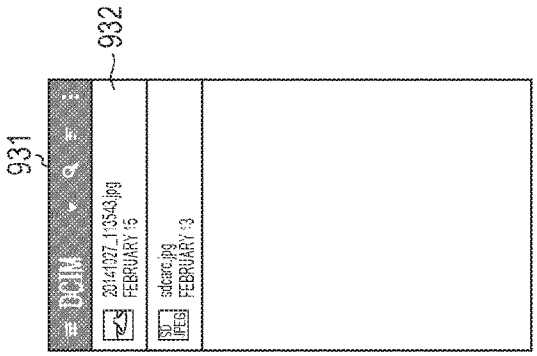
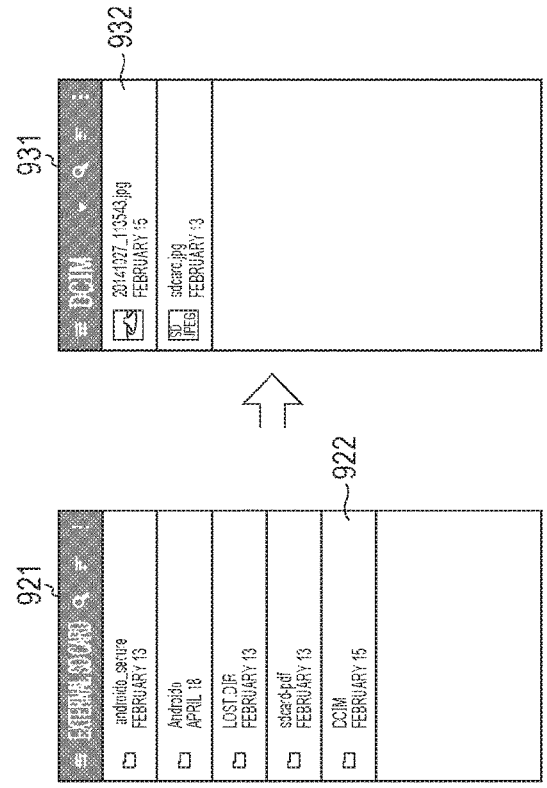
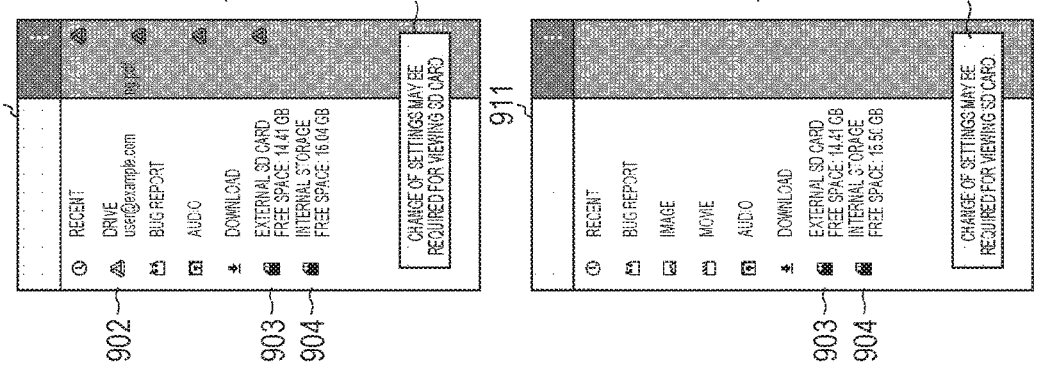
FIG. 9

FIG. 10A

```
1  //invoke picker UI for Storage Access Framework.
2  //shift to document list screen (OPEN_DOCUMENT).
3  if (is OS version equal to or higher than predetermined version?) {
4      Intent intent = new Intent(Intent.ACTION_OPEN_DOCUMENT);   //invocation preparation 1
5      intent.addCategory(Intent.CATEGORY_OPENABLE);              //invocation preparation 2
6
7      //local data is only to be selected.
8      if (is network access disabled?) {
9          intent.putExtra(Intent.EXTRA_LOCAL_ONLY, true);
10     }
11
12     //multiple selections are acceptable.
13     intent.putExtra(Intent.EXTRA_ALLOW_MULTIPLE, true);
14
15     //type of selectable data.
16     intent.setType("*/*");
17
18     //invoke document browser function provided by OS
19     startActivityForResult(intent, OPEN_DOCUMENT_REQUEST_CODE);
20 }
```

FIG. 10B

```
1   //receive result from document browsing function provided by OS.
2   public void onActivityResult(int requestCode, int resultCode, final Intent data) {
3       super.onActivityResult(requestCode, resultCode, data);
4
5       if (requestCode == OPEN_DOCUMENT_REQUEST_CODE) {
6           if (resultCode == Activity.RESULT_OK) {
7               //display progress of processing.
8               settingViewWait(View.VISIBLE);
9
10              acquire selected file list (URI list);
11
12              //error processing
13              if (is number of selected file lists equal to or higher than predetermined number?) {
14                  //if so, display error dialog (excessive selected lists error).
15                  display error dialog;
16              }
17          }
18      }
19  }
```

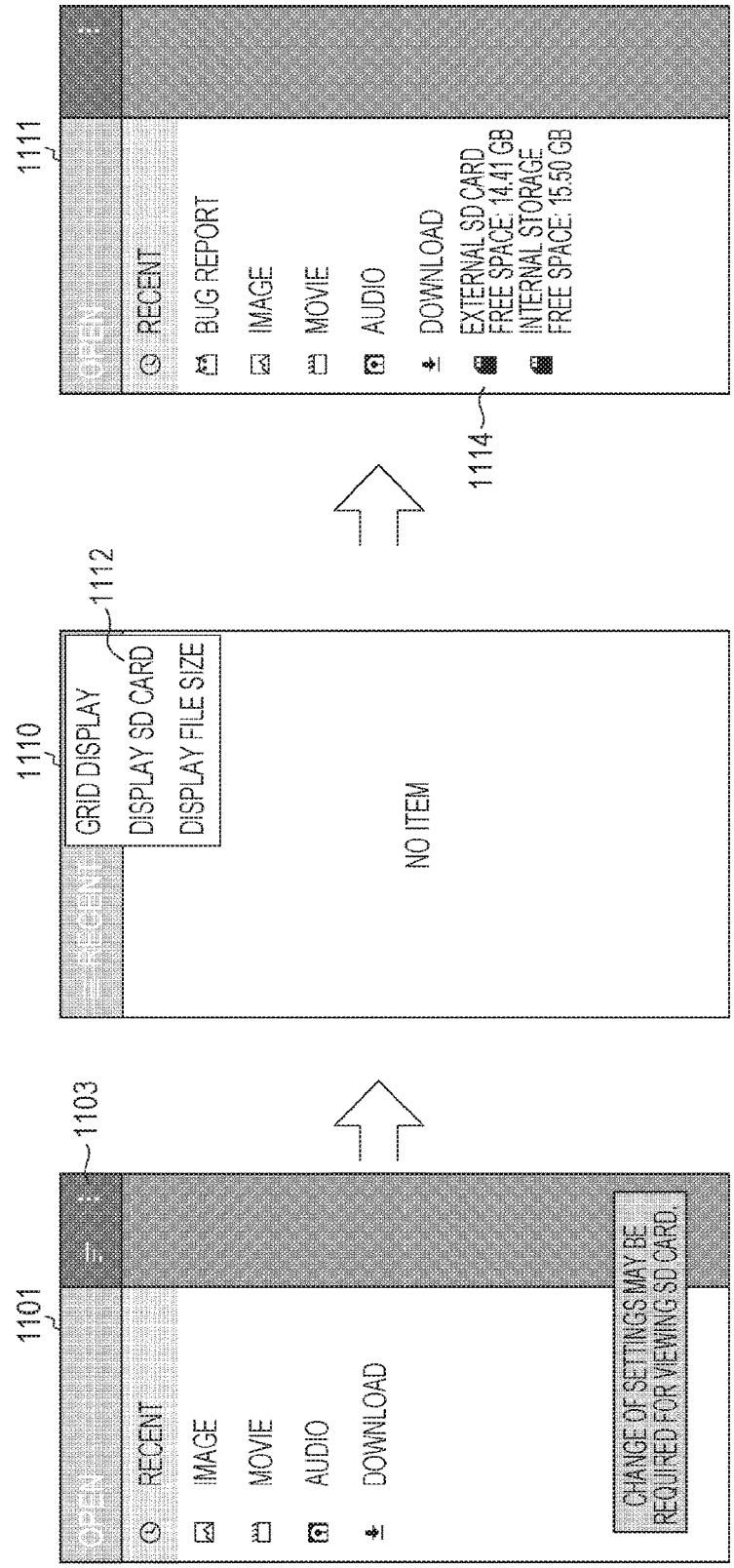

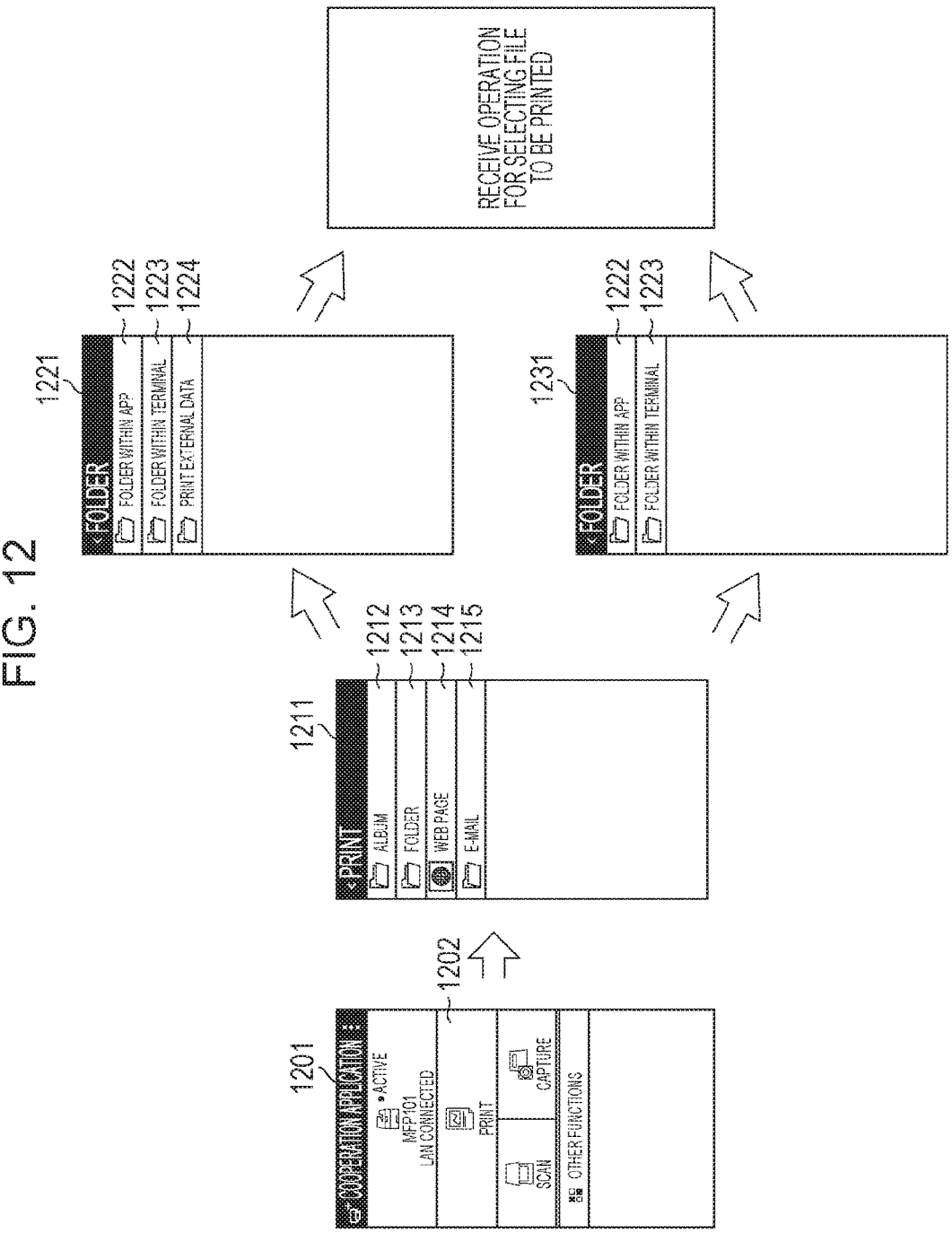

CONTROL METHOD FOR COMMUNICATION TERMINAL AND STORAGE MEDIUM

BACKGROUND OF THE INVENTION

Field of the Invention

The present disclosure relates to a control method for a communication terminal cooperating with an image processing apparatus, and a storage medium.

Description of the Related Art

A communication terminal such as a smartphone and a tablet PC (personal computer) may store various kinds of files. For example, a storage in a communication terminal may hold an image captured by a camera in the communication terminal and various kinds of files such as a file downloaded over the Internet and a file attached to an electronic mail (or e-mail).

In recent years, an application enabling cooperation between an image processing apparatus such as a printing apparatus and a communication terminal has started to widely spread. For example, an application may provide functionality for transmitting data based on a file held in a communication terminal to an image processing apparatus and cause the image processing apparatus to process the data.

Japanese Patent Laid-Open No. 2014-174831 discloses a method for improved convenience in storing a file in a communication terminal. According to Japanese Patent Laid-Open No. 2014-174831, an icon for accessing a predetermined folder within a communication terminal or a folder in an external memory connected to the communication terminal is displayed as an item of a list of data storage destinations.

However, in order for an application running on a communication terminal to prompt a user to select an image or a document file stored in the communication terminal, two types of methods, which will be described below, may mainly be considered.

According to a first method, a user interface (UI) screen displaying a file list is generated within the application, and the application prompts a user to select one of the listed files. According to a second method, a file browsing function provided by an operating system (OS) is used.

For applying the first method, the application needs a file browsing function internally. In order to implement a file browsing function within the application in such a case, a file browsing function specially designed for the application can be provided. For example, a list within a pre-designated folder (such as a folder to be used by the application as a default storage or selection destination) can be displayed on a default selection screen.

According to this file selection method, the application enables quick access to a folder storing a frequently used file. However, in a case where the application includes the internal file browsing function, a mechanism for accessing a cloud storage or an external memory card is to be implemented, which may require time and costs for designing it. It may further increase the cost for maintaining the application because the application may be corrected every time an API for accessing a cloud storage or an external memory card is updated.

On the other hand, according to the second method, the OS may be responsible for the mechanism relating to the file browsing function for selecting a file. In this case, the application can invoke the file browsing function in the OS and can obtain a selected file through the file browsing function in the OS. Therefore, the mechanism provided in the OS can be used for selecting a file, without requiring the mechanism for accessing an external memory card or a cloud storage in the application. However, the file browsing function provided by the OS is designed to support invocations from various applications and cannot be specially defined in detail for a certain application.

SUMMARY OF THE INVENTION

According to an aspect of the present disclosure, there is provided A control method performed by an application executing on a communication terminal that includes an OS (operating system) and that communicably connects the communication terminal to an image processing apparatus, the method comprising, displaying, on an operating unit of the communication terminal, a selection screen for prompting a user to select a file selection method to be used for data transmission to the image processing apparatus in response to a user operation for selecting a file, wherein the selection screen includes at least first and second display items for selecting a file selection method. In response to an instruction to select the first display item received through the selection screen, the application displays a screen for a file selection function provided by the application and determining a file selected through the screen provided by the file selection function as a file to be processed, and in response to an instruction to select the second display item through the selection screen, invoking the file selection function provided by the OS and determining a file selected through the file selection screen provided by the OS in accordance with the invoking as a file to be processed, and transmitting data based on the determined file to the image processing apparatus.

Further features of the present invention will become apparent from the following description of exemplary embodiments with reference to the attached drawings.

BRIEF DESCRIPTION OF THE DRAWINGS

FIG. 9 illustrates example screens to be displayed on the operating unit in the communication terminal.

FIGS. 10A and 10B illustrate a method for invoking a file browsing function provided by an OS.

FIG. 11 illustrates example screens to be displayed on the operating unit in the communication terminal.

FIG. 12 illustrates example screens to be displayed on the operating unit in the communication terminal.

DESCRIPTION OF THE EMBODIMENTS

One aspect of this embodiment provides an application that enables cooperation with an image processing apparatus, wherein one of a plurality of selection methods can be selected for selecting data to be transmitted to the image processing apparatus for improved user convenience relating to selecting the file. Another aspect of this embodiment can reduce the design cost for the application and improve user convenience for selecting data to be transmitted to the image processing apparatus.

Embodiments of the present disclosure will be described with reference to drawings. It should be understood that it is not intended that the following embodiments limit the claimed disclosure and that all of combinations of characteristics according to the embodiments may not be necessary in the present disclosure.

First Embodiment

Figure 1:
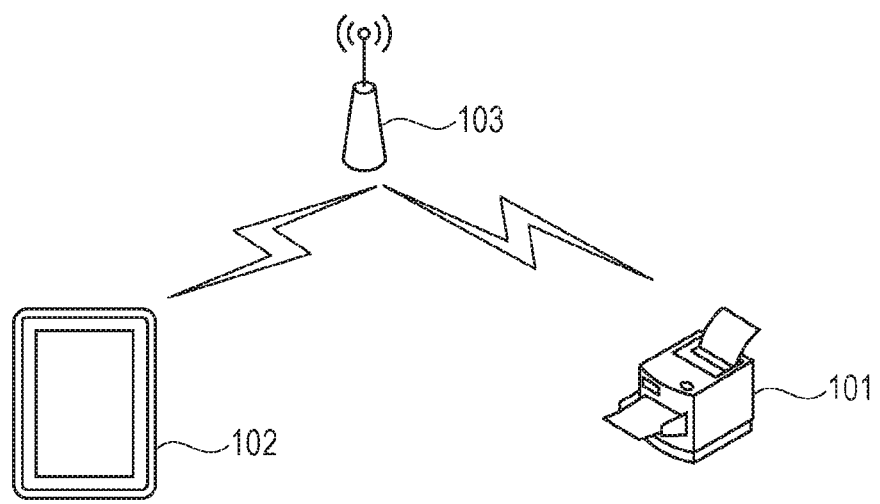
FIG. 1 illustrates an outline of a communication system.

First of all, with reference to FIG. 1, a configuration of a communication system according to the present disclosure will be described. A communication system according to a first embodiment includes a communication terminal 102, an MFP (multifunction peripheral) 101, and an AP (access point) 103.

The communication terminal 102 can execute wireless communication based on IEEE 802.11 Standard (hereinafter, 802.11 Standard). A user may input an SSID (Service Set Identifier) or a security key for connecting to the AP 103 to the communication terminal 102 so that the communication terminal 102 can connect to a network provided by the AP 103.

The MFP 101 is a multifunction peripheral having scanning, printing, copying and other functions. When an SSID or a security key for connecting to the AP 103 is set as a wireless network setting for the MFP 101, the communication terminal 102 and the MFP 101 can execute wireless communication through the AP 103. The MFP 101 can receive print data from the communication terminal 102 through the wireless communication and can print the received print data.

The communication system according to this embodiment has mobile cooperation functionality by which the communication terminal 102 and the MFP 101 cooperate with each other to provide a function to a user. For example, a print cooperation function for transmitting print data to the MFP 101 may be provided to a user of the communication terminal 102. A scan cooperation function may also be provided to the user which may store scan data obtained by reading a document by the MFP 101 within the communication terminal 102.

The communication terminal 102 is communicably connected with the MFP 101 through the AP 103. For example, the communication terminal 102 can transmit/receive print data or scan data to/from the MFP 101 through the AP 103.

The MFP 101 can operate in an access point mode. In the access point mode, the MFP 101 operates as a software access point. The communication terminal 102 may connect to a software AP provided by the MFP 101 to directly execute wireless communication with the MFP 101, not requiring a relay apparatus such as the AP 103.

Having described that a smartphone and a tablet PC (personal computer) as example communication terminals according to this embodiment, embodiments of the present disclosure are not limited thereto. Such a smartphone and a tablet PC are given for illustration purpose only, and the present disclosure is also applicable to any other communication terminals which can execute near-field wireless communication.

Having described an MFP as an example of the image processing apparatus cooperating with a communication terminal according to this embodiment, embodiments of the present disclosure are not limited thereto. For example, the image processing apparatus may be a single function printer or a 3D printer which forms a three-dimensional object. The image processing apparatus may be one which can receive and display data, such as a projector, a display, and a head mount display. This embodiment is applicable to a communication terminal which can select a file by a plurality of selection methods and may transmit data to an image processing apparatus based on the selected file.

Communication Terminal

Figure 2:
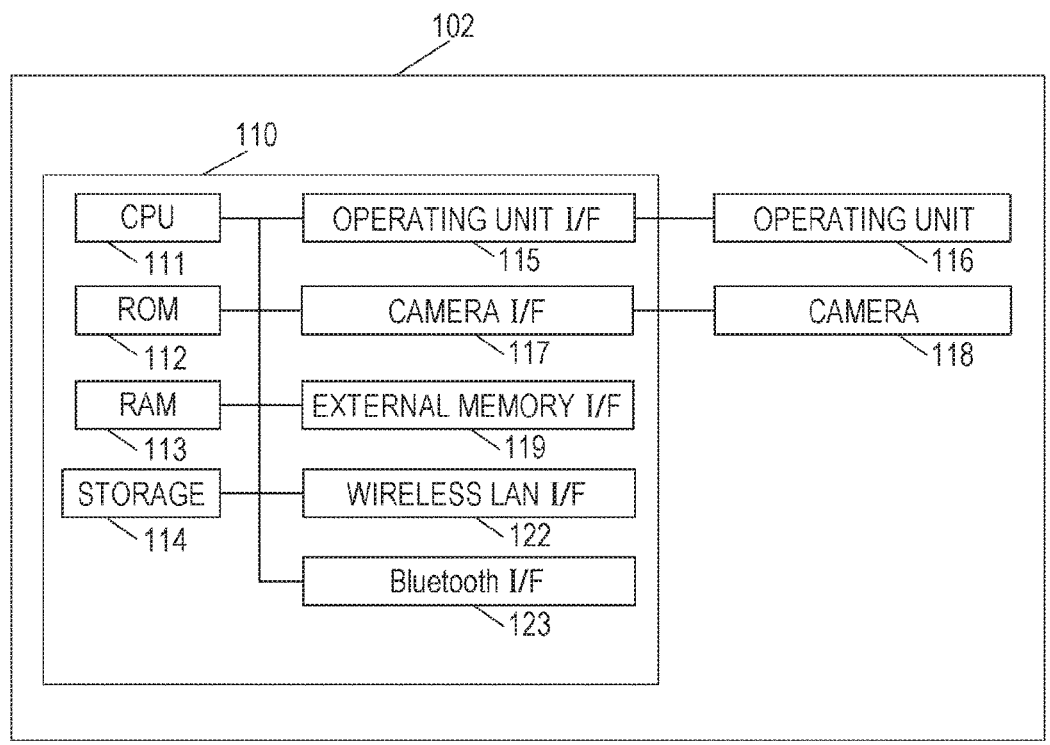
FIG. 2 illustrates an example hardware configuration of the communication terminal.

Next, with reference to FIG. 2, a hardware configuration of the communication terminal 102 will be described. A CPU (central processing unit) 111 in a control unit 110 is configured to read out a control program stored in a ROM (read only memory) 112 or a storage 114 to control the communication terminal 102.

The control unit 110 includes the CPU 111, the ROM 112, a RAM (random access memory) 113, the storage 114, an operating unit I/F 115, a camera I/F 117, and an external memory I/F 119 all of which are connected to a bus. The control unit 110 has a wireless LAN I/F (interface) 122 and a Bluetooth (registered trademark) I/F 123 which are communication interfaces for communicating with external apparatuses. According to this embodiment, the wireless LAN I/F 122 and the Bluetooth I/F 123 are provided as separate hardware modules. However, embodiments are not limited thereto. A combo chip being one hardware module may be provided which can implement both of wireless communication by a wireless LAN and Bluetooth near-field wireless communication.

The CPU 111 may be a central processing unit (processor) configured to generally control operations of the control unit 110. The RAM 113 is a volatile memory and is usable as a temporary storage area for decompressing control programs stored in a work area, the ROM 112 and the storage 114. The ROM 112 is a nonvolatile memory and is configured to store a boot program for the communication terminal 102, for example. The storage 114 is a nonvolatile flash memory having a larger capacity than that of the RAM 113. The storage 114 may store a program for controlling the communication terminal 102. An OS (operating system) 300 and a cooperation application 310, which will be described below, are stored in the storage 114.

The CPU 111 is configured to execute the boot program stored in the ROM 112 to start the communication terminal. The boot program may read out a program corresponding to the OS 300 stored in the storage 114 and decompress it in the RAM 113. After the CPU 111 executes the boot program, the CPU 111 executes the program corresponding to the OS 300 decompressed in the RAM 113 to control the communication terminal 102. The hardware modules such as the CPU 111, the ROM 112, and the RAM 113 implement a so-called computer.

One CPU 111 executes processes illustrated in flowcharts, which will be described below, in the communication terminal 102. However, this embodiment is also applicable to other configurations. For example, a plurality of CPUs or microprocessors (MPUs) may cooperate with each other to execute processes illustrated in the flowcharts, which will be described below. Some of the processes may be executed by using a hardware circuit such as an ASIC (application specific integrated circuit). Processes such as generating a print preview and generating print data can be executed by a cloud service that is accessible over a network.

The operating unit I/F 115 is configured to connect the operating unit 116 and the control unit 110. The operating unit 116 includes a touch panel which can detect a touch operation performed by a user and a display panel configured to display a screen. The operating unit 116 may function as a display unit configured to display information and a receiving unit configured to receive a user instruction. The operating unit 116 may display screens provided by the OS 300 and the cooperation application 310. A user may use an object such as his/her finger to perform a touch operation on the operating unit 116 so that a desired operating instruction can be input to the communication terminal 102. The operating unit 116 may further include a hardware key. A user can press the hardware key to input an operating instruction to the communication terminal 102.

The camera I/F 117 is configured to connect the control unit 110 and the camera 118. The camera 118 is configured to capture an image based on an image-capture instruction from a user. Images captured by the camera 118 are stored in a predetermined area in the storage 114.

The external memory I/F 119 is an interface configured to exchange data with a memory card such as a micro SD (registered trademark) card. The external memory I/F 119 has an external slot to which an external memory can be inserted. When a memory card is inserted to the external slot, the communication terminal 102 gets ready for reading and writing data from and to an area within the memory card through the external memory I/F 119. The memory card may internally store an image and a movie captured by the camera 118, for example. The memory card can also internally store a file downloaded over a network by the communication terminal.

The wireless LAN I/F 122 may provide a wireless client function for executing wireless communication based on 802.11 Standard. The wireless LAN I/F 122 may execute wireless communication based on 802.11 Standard by connecting to an external AP. The external AP may be the MFP 101 which operates in an access point mode or may be the AP 103.

The Bluetooth I/F 123 is an interface configured to exchange data with a peripheral apparatus by executing near-field wireless communication. According to this embodiment, near-field wireless communication based on Bluetooth (IEEE 802.15.1), particularly Bluetooth Low Energy (hereinafter, BLE), can be used to perform handover to wireless communication based on 802.11, for example.

Software Configuration of Communication Terminal 102

Figure 3:
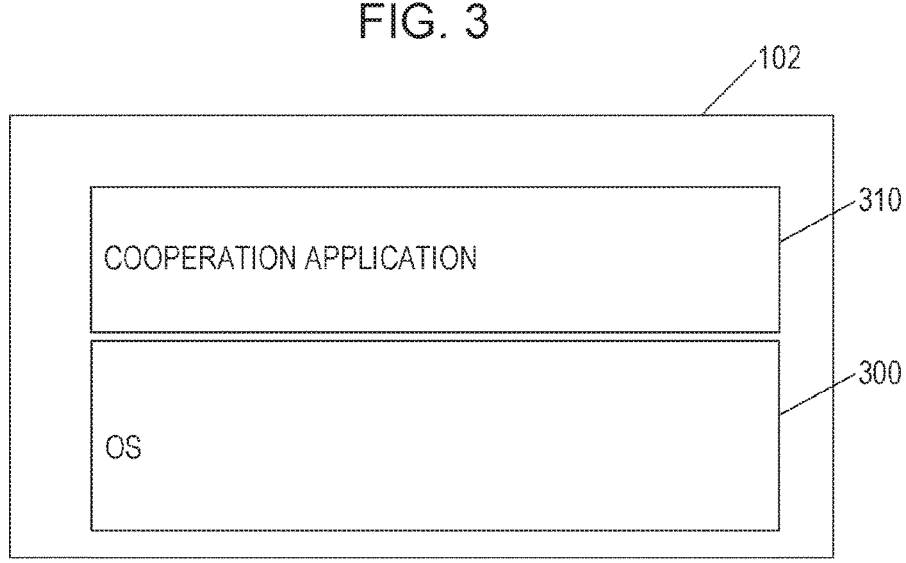
FIG. 3 is an example software configuration of the communication terminal.

Next, with reference to FIG. 3, a software configuration of the communication terminal 102 will be described. FIG. 3 is a functional block diagram of a software module implemented by a control program stored in the ROM 112 or the storage 114 and read by the CPU 111.

The OS 300 is a basic software program configured to generally control operations to be performed in the communication terminal 102. The OS 300 may be Android (registered trademark) provided by Google, for example. The cooperation application 310, which will be described below, and other various application programs can be installed in the communication terminal 102. According to this embodiment, an application for accessing a cloud storage service and an image browsing application configured to be used for browsing an image captured by using the camera 118, for example.

The OS 300 can exchange information with those applications and can change the screen to be displayed on the operating unit 116 in response to instructions given from the applications.

The OS 300 includes a framework and an API usable by the applications for controlling hardware modules of the communication terminal 102 to provide functions for using the hardware modules to the applications running on the OS 300. The OS 300 in response to an instruction from one of the applications may control wireless communication based on 802.11 through the wireless LAN I/F 122 or near-field wireless communication through the Bluetooth I/F 123.

The cooperation application 310 can invoke a function provided by the OS as an API or application framework and change the AP to which the communication terminal 102 is connected to a direct connection AP provided by the MFP. The OS 300 may perform display control over the screen to be displayed on the operating unit 116 in response to an instruction received from one of the applications.

The OS 300 further provides a SAF (storage access framework) as a framework available to an application. The SAF is a coherent selection user interface to applications running on the OS 300 and provides functionality for accessing various files outside or inside the communicating apparatus. More specifically, an application requesting to select a file by using the functionality of the OS 300 use an intent to start a file selection activity provided by the SAF. Here, the term "intent" refers to program code used to start activities provided by another application. The OS 300 having received the instruction to start the file selection activity through the intent displays on the operating unit 116 a selection user interface of the file browsing function provided by the OS 300. Here, the term "activity" refers to an application component providing an operating screen to a user. Hereinafter, a selection user interface for the file browsing function to be provided by the OS 300 will be called a selector or a selection user interface.

The file browsing function of the OS 300 provides functionality for referring to a document of a cloud storage service or a local storage service implemented as a document provider through the selection user interface. For example, according to this embodiment, the OS 300 includes a fundamental document provider. For example, the OS 300 may provide a document provider for accessing the last accessed file and a document provider for accessing a document stored within an external memory. The OS 300 may provide a document provider for accessing a document stored within the storage 114 that is a local storage area. A client application (not illustrated) for accessing the cloud storage service installed in the communication terminal 102 may provide a document provider for accessing a file on a cloud.

In this manner, the cooperation application 310 can use the SAF provided by the OS and a common selection user interface to access contents of an embedded document provider provided by the OS in the communication terminal 102. The cooperation application 310 can also access contents of a document provider provided by an application installed in the communication terminal 102 by using the common selection user interface.

Next, the cooperation application 310 will be described. The cooperation application 310 can store, as internal information, settings to be used by the cooperation function and a list of apparatuses such as MFPs to be cooperated. The list of apparatuses may store management information for managing MFPs to be cooperated including apparatus names and capability information of the external apparatus, and connection information for connection to the external apparatuses. The cooperation application 310 can register an external apparatus such as an MFP with the list of apparatuses in response to a search processing for an MFP or a manual input performed by a user. When the cooperation application 310 receives a user operation for selecting an MFP registered with the list of apparatuses on a selection screen, not illustrated, the cooperated MFP is changed to the selected MFP.

The cooperation application 310 can transmit print data based on a file to the cooperated MFP (such as the MFP 101). The file may be selected by using the file browsing function applying the selection user interface provided by the OS 300 or by using a file selection function implemented as an internal function of the cooperation application 310 (details of which will be described below).

MFP

Figure 4:
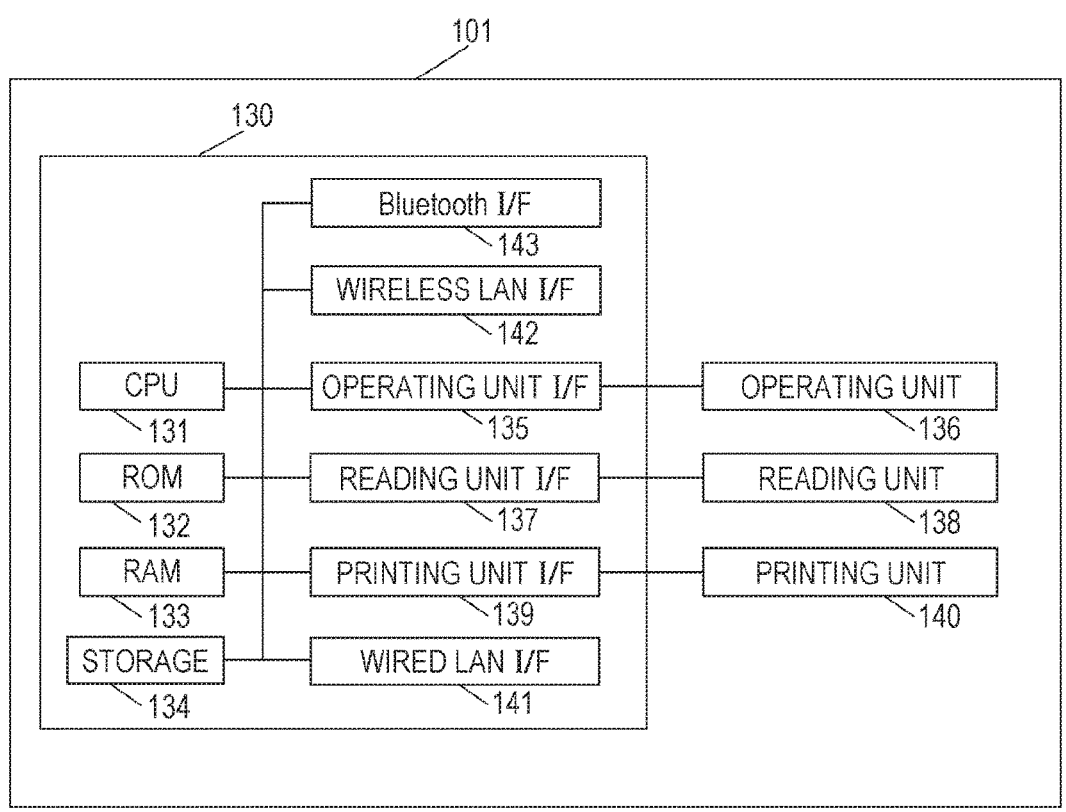
FIG. 4 illustrates an example hardware configuration of an MFP.

Next, the MFP 101 will be described. FIG. 4 is a block diagram illustrating a hardware configuration of the MFP 101. The MFP 101 has a reading function for reading an image and a print function for printing an image on a sheet.

The control unit 130 including the CPU 131 is configured to generally control operations to be performed by the MFP 101. The CPU 131 may read out a control program stored in the ROM 132 or the storage 134 and perform controls such as a print control and a reading control. The ROM 132 is configured to store a control program executable by the CPU 131. The RAM 133 may be a main storage memory for the CPU 131 and is usable as a work area or a temporary storage area for decompressing an instruction from a control program. The storage 134 is a storage unit configured to store print data, image data, a program, and setting information. Having described that one CPU 131 implements a control using one memory (RAM 133) in the MFP 101 according to this embodiment, a plurality of processors, RAMs, ROMs, and storages, for example, may be collaborated to execute controls, which will be described below.

An operating unit I/F 135 is configured to connect an operating unit 136 and the control unit 130. The operating unit 136 includes a liquid crystal display unit having a touch panel function and hardware keys and may function as a display unit configured to display information and a receiving unit configured to receive a user instruction. A reading unit I/F 137 is configured to connect a reading unit 138 and the control unit 130. The reading unit 138 is configured to read a document and generate the read image. The generated read image may be transmitted to an external apparatus or may be printed. A printing unit I/F 139 is configured to connect a printing unit 140 and the control unit 130. The printing unit 140 is configured to print an image on a sheet based on externally received print data.

The control unit 130 is configured to connect to a network, not illustrated, through a wired LAN I/F 141. The wired LAN I/F 141 is configured to transmit an image or information to an external apparatus over a network, not illustrated, and receive print data or information from an external apparatus. The control unit 130 further includes a wireless LAN I/F 142 and a Bluetooth I/F 143. The wireless LAN I/F 142 provides functionality of a wireless client for wireless communication by connecting to an external AP and functionality of a software AP for enabling the MFP 101 to behave as an AP. The Bluetooth I/F 143 is an interface usable for exchanging data with a peripheral apparatus by a near-field wireless communication. The MFP 101 according to this embodiment can use near-field wireless communication based on BLE to communicate with the communication terminal 102 and hand over to wireless communication based on 802.11.

External Cooperation Function

Next, cooperation functions provided by the cooperation application 310 will be described. The cooperation application 310 has a plurality of cooperation functions such as a print function for transmitting print data to an MFP and a scan cooperation function for storing a document scanned by an MFP in a storage in the communication terminal.

As methods for prompting a user to select a picture or a document file stored in the communication terminal from the cooperation application running on the communication terminal, the following two kinds of methods may mainly be applicable.

According to a first method, a user interface (UI) screen displaying a file list may be generated within the application, and a user may be prompted to select one of files on the file list. According to a second method, the file browsing function provided by the OS may be used.

When the first method is adopted, the file browsing function is to be installed within an application. When the file browsing function is implemented within the application, the file browsing function is specially designed for the application. For example, a list of internal data within a pre-designated folder (such as a folder to be used as a default storage destination or selection destination by the application) can be displayed on a default selection screen.

Adopting this file selection method enables quick access to a folder storing a file frequently used by the application. However, when the file browsing function is installed within an application, a mechanism for accessing a cloud storage or an external memory card may also be implemented, which may require time and costs for designing it. Also, every time an API for accessing a cloud storage or an external memory card is updated, the application may be modified, which may require application maintenance cost.

On the other hand, when the second method is adopted, the OS may be responsible for a mechanism of the file browsing function for selecting a file. In this case, the application can invoke the file browsing function of the OS to obtain a file selected by the file browsing function of the OS. Therefore, the application can select a file by using the mechanism provided by the OS without implementing a mechanism for accessing an external memory card or a cloud storage. However, the file browsing function provided by the OS is configured to be invoked by various applications. Therefore, detail settings may not be specially defined for each application.

This embodiment allows an application in communication with the image processing apparatus to select a plurality of selection methods for selecting data to be transmitted to the cooperated image processing apparatus so that a mechanism for improved user convenience relating to the file selection can be provided. This embodiment also provides a mechanism which can reduce the design cost for an application and, at the same time, can improve user convenience in selecting data to be transmitted to the cooperated image processing apparatus. Next, specific selection methods will be described.

Figure 5:
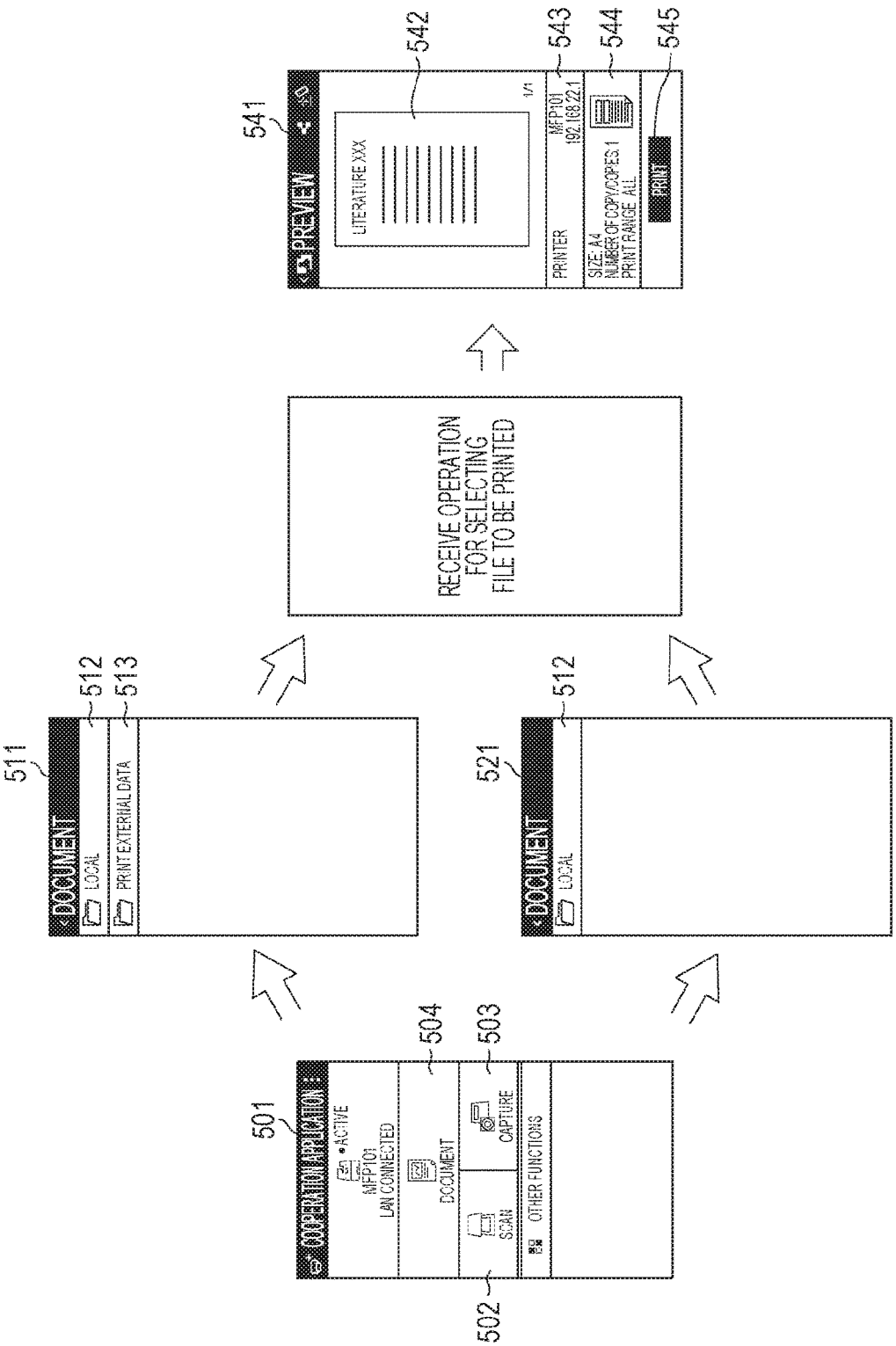
FIG. 5 illustrates an example screen to be displayed on an operating unit in the communication terminal.

FIG. 5 illustrates example screens to be displayed on the operating unit 116 in the communication terminal 102. The screen examples illustrated in FIG. 5 are to be displayed by the cooperation application 310.

When an icon of the cooperation application is selected by a user operation through an application list screen (also called a drawer) or a home screen on the communication terminal 102, the CPU 111 starts the cooperation application 310. After the start processing completes, the cooperation application 310 displays a top menu screen 501 on the operating unit 116 in the communication terminal 102.

First, functions of the cooperation application 310 will be described with reference to the top menu screen 501. A user can execute functions included in the cooperation application 310 through the top menu screen 501. According to this embodiment, the MFP 101 is designated as an apparatus to be cooperated, for example. The cooperation application 310 stores information regarding MFPs which have been registered in the storage 114 as a list of apparatuses with which cooperation, by user operation, can occur. One of the MFPs registered with the list of apparatuses can then be selected as an MFP to be cooperated.

The cooperation application 310 can execute a cooperation function by cooperating with an MFP (such as the MFP 101) designated to be cooperated. A DOCUMENT key 504 is usable for transmitting image data or document data stored within the communication terminal to the cooperated MFP and printing it. A SCAN key 502 is usable for executing a cooperated scan function for scanning a document in the cooperated MFP and storing data obtained by the scanning within the storage 114 in the communication terminal. The data obtained from the MFP in cooperation may be stored in a predetermined folder (such as a predefined storage folder generated by the cooperation application) in the communication terminal 102. A. CAPTURE key 503 is usable for imaging a document or a white board by using the camera 118. Data such as an image obtained by the capture function are stored in a predetermined folder in the communication terminal 102.

A folder to be used as a storage destination for the cooperated scan function or the capture function is configured to be easily accessible by the print function. Therefore, in order to use the print function, a user can easily access data (file) obtained by the cooperated scan function or the capture function and select a file to be printed.

Next, processing will be described which prompts a user to select a file to be printed after the DOCUMENT key 504 is selected.

If the DOCUMENT key 504 is selected, the communication terminal 102 changes the screen to be displayed on the operating unit 116 to a DOCUMENT screen 511 or 521. The screen 511 displays a LOCAL key 512 and a PRINT EXTERNAL DATA key 513. The LOCAL key 512 is usable for opening a predetermined folder (such as a predefined storage folder) by using the file browsing function implemented by the cooperation application 310 as a current folder. The user can use the key 512 to easily access data (file) obtained by the cooperated scan function or the capture function and select it as a file to be printed.

On the other hand, the PRINT EXTERNAL DATA key 513 is usable for invoking the file browsing function provided by the OS 300. A user can use the key 513 to select a file within an external memory card or select a file from the last used file list according to the mechanism provided by the OS.

The DOCUMENT screen 521 is an example screen to be displayed when the OS 300 is of a version not supporting the file browsing function. The cooperation application 310 is configured to display a DOCUMENT screen not including a key for selecting the file browsing function provided by the OS 300 when the version of the OS 300 does not support the SAF.

If a file to be printed is selected by the file browsing function implemented by the cooperation application 310 or the file browsing function provided by the OS 300, the cooperation application 310 changes the screen to be displayed on the operating unit 116 to a PREVIEW screen 541.

The cooperation application 310 may display a preview image for checking data to be printed on an area 542 on the PREVIEW screen 541. The preview image to be displayed on the area 542 may be generated based on the selected file. The preview image generation may be performed by the CPU 111, or the preview image generation may be requested to a cloud service, not illustrated, so that the cloud service can be caused to generate a preview image.

An area 543 is configured to display information provided by the MFP in cooperation with the communication terminal. According to this embodiment, the MFP 101 is selected as a cooperated apparatus, for example. The area 543 functions as a display item for changing the cooperated MFP. A user can select the area 543 to shift to a screen for selecting a cooperated MFP, not illustrated, select a desired MFP from MFPs on the apparatus list as an apparatus for cooperation, and change the cooperated MFP.

An area 544 may display print settings defined for print data to be transmitted to an MFP. The area 544 may also function as a display item for shifting to a print setting screen. A user can select the area 544 to define detail print settings.

A PRINT key 545 is usable for performing printing based on a selected document. A user can select a file to be printed and perform printing based on the file by following the screen sequence illustrated in FIG. 5. The PRINT key may be usable for giving a transmission instruction for transmitting data based on a selected file.

According to this embodiment, a key for receiving a user operation may also be called a display item for receiving a user operation. A display area, options, and items by which a user operation can be received are also called display items by which a user operation can be received.

Figure 6:
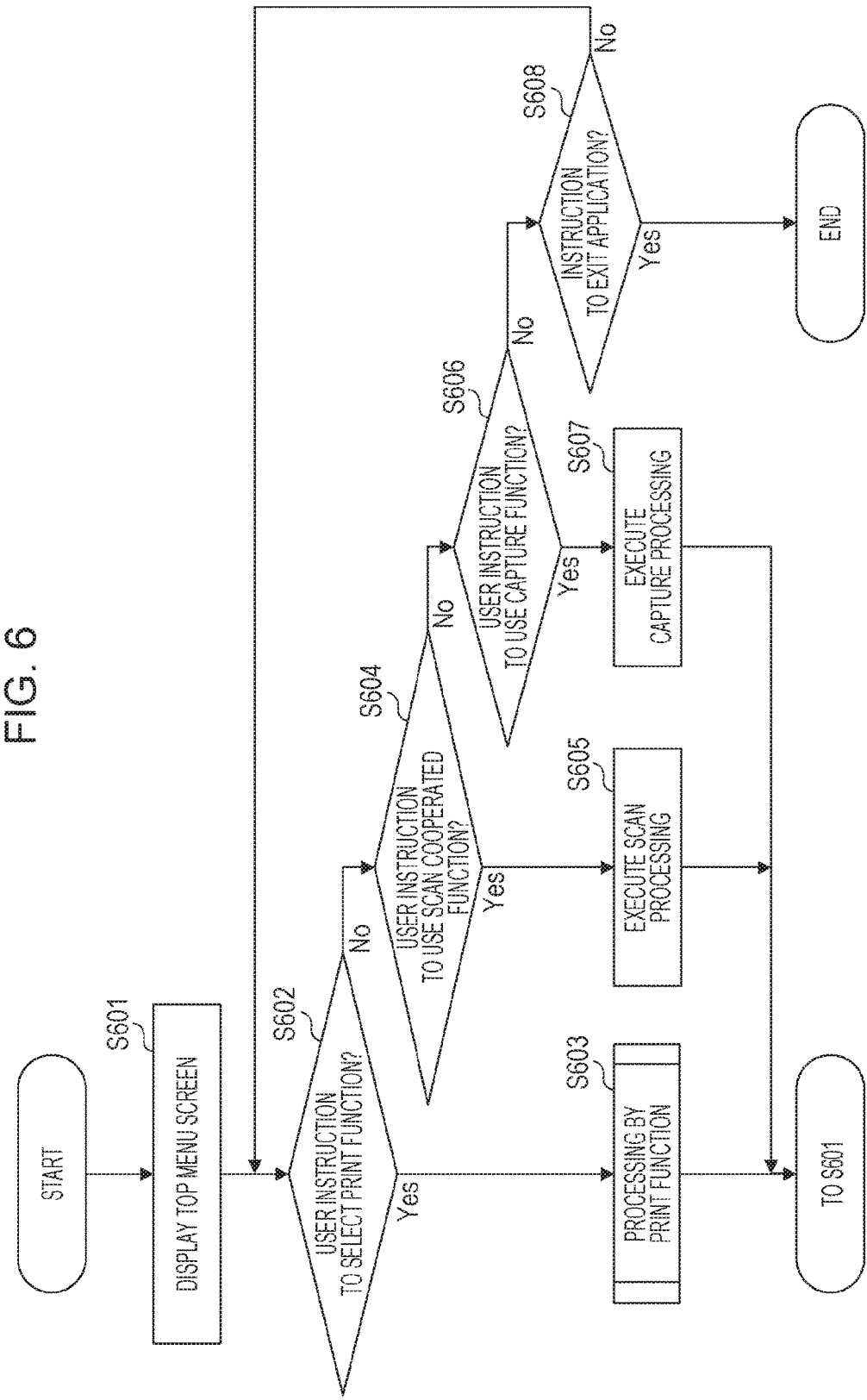
FIG. 6 is an example flowchart illustrating a control to be performed in the communication terminal.
Figure 7:
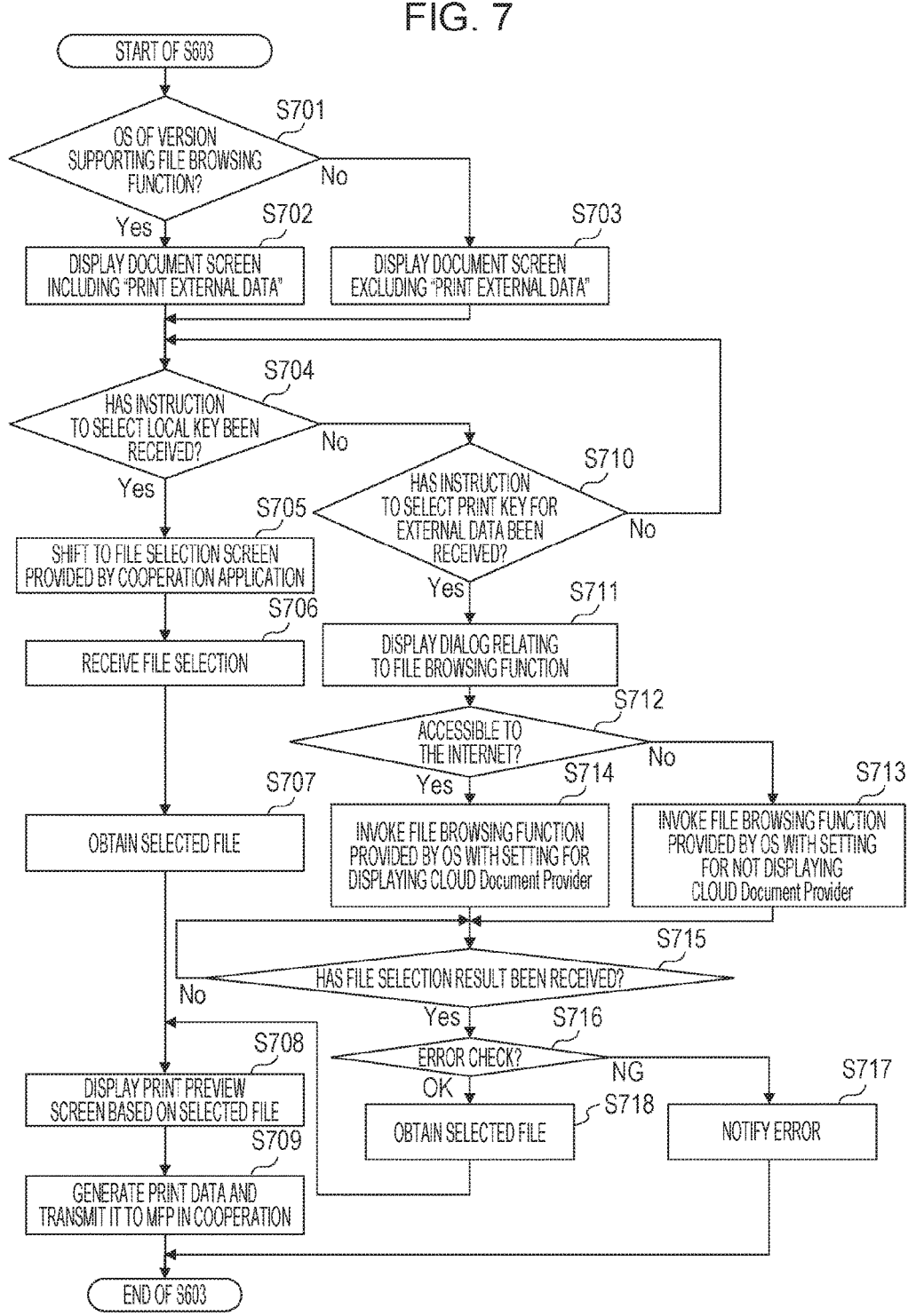
FIG. 7 is an example flowchart illustrating a control in the communication terminal.

Next, a specific control for enabling to become a plurality of selection methods available for selecting data to be transmitted to a cooperated MFP will be described with reference to flowcharts illustrated in FIGS. 6 and 7. FIGS. 6 and 7 are flowcharts illustrating a control to be performed in the communication terminal 102.

Operations (steps) illustrated in the flowcharts in FIGS. 6 and 7 may be implemented by a program for implementing control modules, which is stored in the ROM 112 or the storage 114, read out therefrom to the RAM 113 and executed by the CPU 111. The processing illustrated in the flowcharts is implemented by the cooperation application 310, which is the subject, in cooperation with the OS 300, which is a control program. In order to clearly describe the control program that is the subject causing operations, the operations will be described as being performed subjectively by the OS 300 or the cooperation application 310.

FIG. 6 is a flowchart illustrating operations to be performed in the communication terminal 102 in a case where an icon corresponding to the cooperation application is selected through the drawer or the home screen in the communication terminal 102.

In step S601, the CPU 111 displays the top menu screen 501 on the operating unit 116. In step S602, the CPU 111 judges whether a user instruction to use a print function has been received or not. If the user instruction to use the print function has been received, the processing moves to step S603. If not, the processing moves to step S604. A user operation for instructing to use the print function may be an operation for selecting the key 504 displayed on the top menu screen 501, for example.

In step S603, the CPU 111 executes processing of the print function for the MFP. The processing of the print function will be described in detail below with reference to the flowchart in FIG. 7. When the processing of the print function completes, the CPU 111 changes the screen displayed on the operating unit 116 to the top menu screen. The processing then returns to step S601.

In step S604, the CPU 111 judges whether a user instruction to use the cooperated scan function has been received or not. If the user instruction to use the cooperated scan function has been received, the processing moves to step S605. If not, the processing moves to step S606. A user operation to instruct to use the cooperated scan function may be an operation for selecting the key 502 displayed on the top menu screen 501, for example.

In step S605, the CPU 111 executes the scan processing in cooperation with a cooperated MFP (such as the MFP 101). An example in which the MFP 101 is a cooperated MFP will be described. The CPU 111 in cooperation with the MFP 101 receives, by wireless communication, data based on an image obtained by reading a document by the reading unit 138 in the MFP 101. The CPU 111 stores the received data in a predetermined folder within the storage 114. When the storing completes, the CPU 111 changes the screen displayed on the operating unit 116 to the top menu screen. The processing then returns to step S601.

In step S606, the CPU 111 judges whether a user instruction to use the capture function has been received or not. If the user instruction to use the capture function has been received, the processing moves to step S607. If not, the processing moves to step S608. A user operation for using the capture function may be an operation for selecting the key 503 displayed on the top menu screen 501, for example.

In step S607, the CPU 111 executes the capture processing. The CPU 111 in cooperation with the camera 118 captures an image. According to this embodiment, the capture processing can capture an image in a mode specially for capturing an image of a paper document or in a mode specially for capturing an image of a white board. For example, in the mode specially for capturing an image of a paper document, a region of the captured image of the paper document can be designated, and keystone correction can be performed thereon. Then, image processing can be performed thereon for transforming the region of the captured image of the paper document to a rectangular shape. In this case, even when the paper document is image-captured into a trapezoidal shape, a region of the paper document can be extracted, and an image having the region corrected to a rectangular shape can be obtained. For example, in the mode specially for image-capturing a white board, image processing can be performed which adjusts a gloss within a captured image. In this case, the resulting image can have a reduced influence of reflection of light on the white board. The CPU 111 may store the captured image possibly having undergone image processing in a predetermined folder within the storage 114. After storing is completed, the CPU 111 changes the screen displayed on the operating unit 116 to the top menu screen. The processing then returns to step S601.

Next, in step S608, the CPU 111 judges whether an instruction to exit the application has been received or not. If the instruction to exit the application has been received, the CPU 111 terminates the execution of the cooperation application 310 and shifts the screen displayed on the operating unit 116 to the home screen provided by the OS 300. Then, the series of operations of the control ends. On the other hand, if the instruction to exit the application has not been received, the processing returns to step S601.

In this manner, a user can execute various functions including the scan function, the capture function, and the print function by using the cooperation application 310.

Next, processing of the print function will be described with reference to the flowchart in FIG. 7. In step S701, the CPU 111 judges whether the OS is of a version supporting the file browsing function or not. The cooperation application 310 inquires the OS 300 about the version of the OS 300. If the version of the OS 300 obtained as a result of the inquiry is a version preceding a predetermined version, the cooperation application 310 judges that the OS is of a version not supporting the file browsing function. The processing then moves to step S703. On the other hand, if the version of the OS 300 obtained as a result of the inquiry is a version following the predetermined version, the cooperation application 310 judges that the OS is of a version supporting the file browsing function. The processing then moves to step S702.

In step S702, the cooperation application 310 displays on the operating unit 116 the DOCUMENT screen 511 including "PRINT EXTERNAL DATA". On the other hand, in step S703, the cooperation application 310 displays on the operating unit 116 the DOCUMENT screen 521 not including "PRINT EXTERNAL DATA".

The processing in steps S701 to S703 is exceptional in which the cooperation application 310 hides a key for invoking the file browsing function provided by the OS by using the intent if the OS 300 is of a version not supporting the SAF.

In step S704, the CPU 111 judges whether an instruction to select the LOCAL key 512 has been received or not. If the instruction to select the LOCAL key 512 has been received, the processing moves to step S705. If not, the processing moves to step S710.

Figure 8:
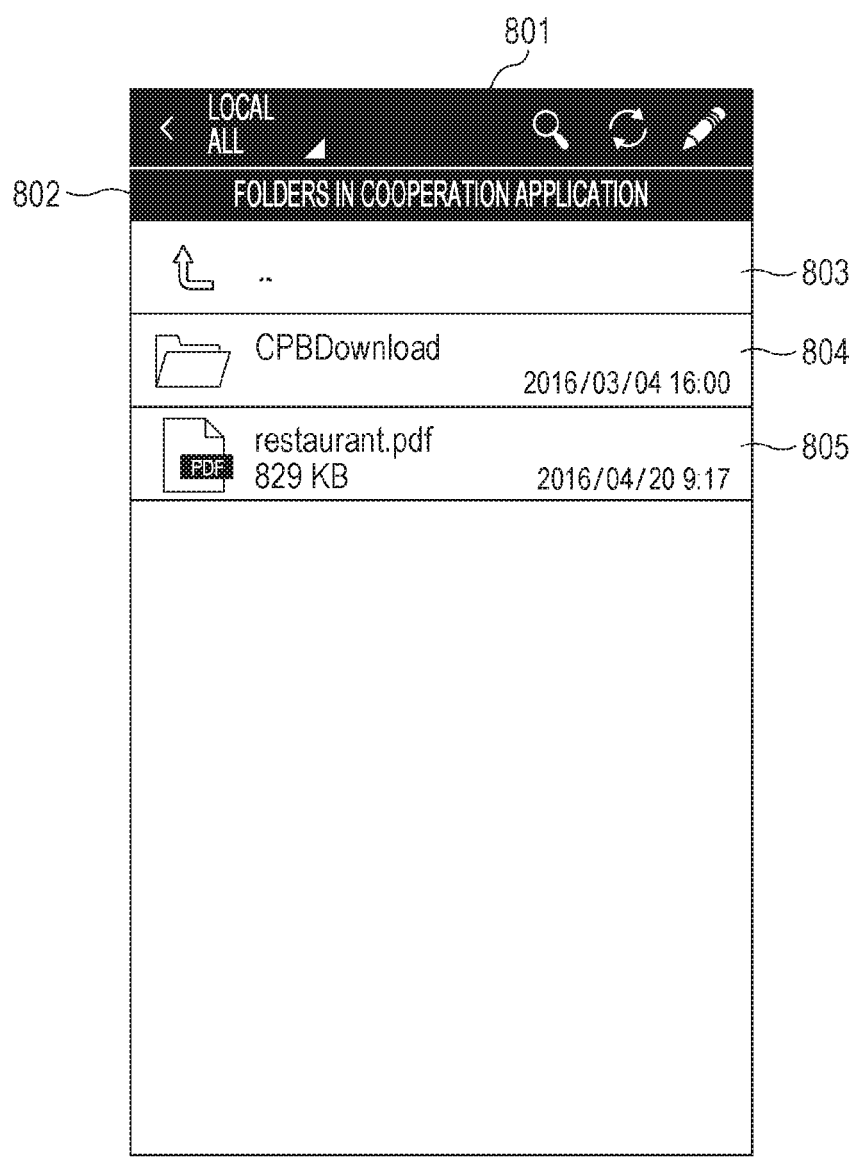
FIG. 8 illustrates an example screen to be displayed on the operating unit in the communication terminal.

Next, a file selection operation will be described which uses the cooperation application 310 in response to the instruction to select the LOCAL key 512. In step S705, the CPU 111 shifts the screen displayed on the operating unit 116 to a file selection screen provided by the cooperation application 310. FIG. 8 illustrates an example screen to be displayed on the operating unit 116 in the communication terminal 102, which is a file selection screen 801 provided by the cooperation application 310. The file selection screen 801 displays information 802 indicating the name of a currently opened folder. According to this embodiment, the cooperation application 310 may display a screen having a list of predetermined folders usable as predefined storage destinations for the cooperated scan function and the capture function when the LOCAL key is selected.

An option 803 is usable for opening a folder at one upper level. A user can use the option 803 to refer to a folder used as a predefined storage destination by another application.

An option 804 is usable for opening a sub folder (CPB-Download folder) in the predefined folder. In response to an operation for selecting an option presenting a sub folder in a current folder, a screen having a list of files within a lower level folder is displayed. In response to an operation for selecting the option 803, a folder at one upper level can be accessible. An option 805 corresponds to an example file within the predefined folder. A user can select the option 805 indicating a file. In a case where a plurality of files exists within the folder, a plurality of files is selectable. When the selection completes, the CPU 111 displays the PREVIEW screen 541, for example, illustrated in FIG. 5.

Referring back to the illustration in FIG. 7, the CPU 111 in step S706 receives a user instruction to select a file through the file selection screen 801 provided by the cooperation application 310. In step S707, a file selected in step S706 is obtained. In step S708, the CPU 111 generates a print preview image based on the selected file and displays a PRINT PREVIEW screen. In step S709, the CPU 111 generates print data for printing the file based on the selected file and transmits it to the MFP 101. More specifically, the CPU 111 transmits the print data in response to a print instruction. It should be noted that the print instruction may be given by pressing the PRINT key 545 illustrated in FIG. 5, for example. The receipt of the print instruction can be judged according to any other method. For example, the receipt of the print instruction may be judged based on a detection of proximity between the MFP 101 and the communication terminal 102 in a state that the PRINT PREVIEW screen 541 in FIG. 5 is being displayed. The proximity can be judged by using Bluetooth near-field wireless communication. For example, in response to a detect of a shake gesture performed by the communication terminal 102 in a state that the PRINT PREVIEW screen 541 in FIG. 5 is being displayed, it can be judged that the print instruction has been performed. Next, the CPU 111 generates print data based on the selected file. When the print data generation completes, the print data are transmitted to a cooperated MFP (such as the MFP 101). The processing then ends. According to this embodiment, wireless communication based on 802.11 may be used to transmit print data to a cooperated MFP. The print data may be transmitted by wireless communication through the AP 103 or by wireless communication through a software AP provided by the MFP 101. A direct wireless communication using Wi-Fi Direct (registered trademark) may be established to transmit the print data by P2P wireless communication. Alternatively, the print data may be transmitted by P2P wireless communication using Wi-Fi. Aware (registered trademark). A handover using Bluetooth near-field wireless communication, for example, can be used to establish a wireless communication based on 802.11 with the MFP 101.

The MFP having received the print data from the communication terminal 102 executes printing based on the received print data. This processing will be described with reference to a case where the MFP is the MFP 101, for example. The CPU 131 in the MFP 101 receives print data from the communication terminal 102. The CPU 131 executes printing based on the received print data in cooperation with the printing unit 140. More specifically, the CPU 131 generates a print image based on the received print data and transfers it to the printing unit 140. The printing unit 140 having received the print image prints the print image on paper, for example.

Next, a file selection operation using the file browsing function provided by the OS 300 will be described. In step S710, the CPU 111 judges whether an instruction to select the PRINT EXTERNAL DATA key has been received or not. If the instruction to select the PRINT EXTERNAL DATA key has been received, the processing moves to step S711. If not, the processing returns to step S704 where the processing waits for a selection instruction performed by a user.

Before describing specific processing after step S711, an overview of the file browsing function provided by the OS 300 will be described with reference to FIGS. 9 and 10A and 10B. FIG. 9 illustrates a selection user interface that is a user interface provided by the OS 300 in order to use the file browsing function provided by the OS 300. FIG. 10A illustrates a method for invoking the file browsing function provided by the OS 300 from an application such as the cooperation application 310. FIG. 10B illustrates a method for obtaining a file list from the file browsing function of the OS by the cooperation application 310.

Screens 901 and 911 are example user interface screens provided by the selector of the OS 300. The cooperation application 310 requests to start an activity for the file selection provided by the file browsing function of the OS by using an explicit intent. In response to the request to start the activity for the file selection, the OS 300 displays a screen corresponding to the activity on the operating unit 116.

Start of the activity will be described with reference to sample code illustrated in FIG. 10A. Lines 4 to 16 describe generation of an intent. Line 4 is a description defining that the activity to be started by the intent is an activity of the selection user interface of the SAF. Lines 5 to 16 are descriptions designating arguments and operating conditions to be supplied to the activity using the intent. For example, according to this embodiment, an argument is designated which indicates that a file which can be directly accessed on the image processing apparatus without downloading from a remote service is to be returned in accordance with the network access state. Additionally or alternatively, an argument indicating that a plurality of options can be selected or a condition indicating the selectable type of data may be designated.

Line 19 is a description for starting an activity of the selection user interface of the SAF. Here, the activity is started by invoking startActivityForResult( ) function to receive a result of a file selection from the activity of the SAF.

Referring back to FIG. 9, in response to a request to start the activity of the selection user interface from the cooperation application 310, the OS 300 displays a selection user interface screen such as a screen 901 or a screen 911. The screen 911 is a selection user interface screen to be displayed when the argument is designated which indicates that a file which can be directly accessed on the apparatus without downloading from a remote service is designated as an argument of the intent. The screen 901 is a selection user interface screen to be displayed when the argument is not designated which indicates that a file which can be directly accessed on the apparatus without downloading from a remote service is designated as an argument of the intent.

A dialog 905 is associated with the file browsing function provided by the OS 300. The dialog is displayed over (or superimposed on) the operating screen for a predetermined period of time. The CPU 111 terminates the display of the dialog after a lapse of the predetermined period. It may be configured such that the dialog can be displayed only in a case where the PRINT EXTERNAL DATA key 513 on the DOCUMENT screen 511 is selected. According to this embodiment, a user may be notified of that settings for the selector may be changed in consideration of a case where the selector does not have an access right to a memory card. FIG. 11 illustrates a case where the selector does not have an access right to a memory card. In a case where the selector does not have an access right to a memory card, an option for accessing the memory card is not displayed as on a screen 1101. A method will be described which changes a setting for the selector by a user to provide the right to access to the memory card to the picker. A setting key 1103 is usable for viewing settings for the picker. If the setting key 1103 is selected, the OS 300 displays a selector setting screen 1110. The selector setting screen 1110 includes an item 1112 for display of an SD card. A user may select the item 1112 to provide the right to access to the memory card to the picker. In response to the user operation to select the item 1112, the OS 300 provides the right to access to the memory card mounted in the external memory I/F to the picker. When the access right is given to the picker, a display item 1114 for accessing the memory card is displayed on a screen 1111.

Referring back to FIG. 9, selection of a file through the selection user interface will be described. A key 902 is usable for selecting a file in a cloud storage service. If the key 902 is selected, the OS 300 accesses the cloud storage service and displays a file selection screen held in a cloud storage. According to this embodiment, the cloud storage service may be Google Drive (registered trademark), for example. However, embodiments of the present disclosure are not limited thereto.

A key 904 is usable for selecting a file within the storage 114 in the communication terminal 102. If the key 904 is selected, the OS 300 displays a selection screen for selecting a file in a root folder in the storage 114.

A key 903 is usable for selecting a file within an external SD card mounted in the external memory I/F. If the key 903 is selected, the OS 300 displays a selection screen 921 for selecting a file within the root folder in the memory card mounted in the external memory I/F.

A user can access a folder hierarchy within the memory card through the selection screen 921 to select a file. A case where an option 922 is selected by a user will be described below. If the option 922 is selected by a user, the OS 300 displays a screen 931 for selecting a file within a "DCIM" folder in the memory card. Through the screen 931, a user can select an option (such as an option 932) indicating a file to be displayed. On the file selection screen, a plurality of files can be selected. In response to a user instruction to end the file selection, the OS 300 ends the activity by the selection user interface. The OS 300 transmits a file obtaining result to the cooperation application 310 which has started the activity as the activity end processing.

The reception of the result will be described with reference to sample code in FIG. 10B. FIG. 10B illustrates a onactivityresult( ) method for receiving a result from an activity of the selection user interface.

When an activity invoked by the explicit intent completes, the OS 300 returns a result thereof to the onactivityresult( ) method of the cooperation application 310. In the method illustrated FIG. 10B, processing for checking whether a request has succeeded or not or processing for obtaining a selected file list is performed. Additionally, processing such as an error check may be performed. The obtained file list stores a URI (uniform resource identifier) for accessing a file. If a plurality of files is selected through the selection user interface, URIs for accessing the files are stored. The cooperation application 310 can use the URI or URIs to access the file or files selected through the selection user interface.

Referring back to the flowchart in FIG. 7, file selection using the file browsing function of the OS will be described. If an instruction to select the PRINT EXTERNAL DATA key 513 is received in step S710, the cooperation application 310 in step S711 displays the dialog 905 associated with the file browsing function. This dialog may be displayed over another operating screen during a predetermined period of time.

In step S712, the cooperation application 310 judges in cooperation with the OS 300 whether it is accessible to the Internet. If it is judged that it is not accessible to the Internet, the processing moves to step S713. If so, the processing moves to step S714. The processing in step S712 corresponds to the processing on Line 8 in the sample code in FIG. 10A.

In step S713, the CPU 111 invokes the file browsing function provided by the OS with a setting that hides the cloud document provider. More specifically, the cooperation application 310 sets the argument illustrated on Line 9 in FIG. 10A in the intent for invoking the SAF selection user interface. The cooperation application 310 requests to start a selection user interface activity by using the explicit intent. The OS 300 having received the start request for the selection user interface activity starts the selection user interface activity and shifts the screen on the operating unit 116 to the selection user interface screen 911 (FIG. 9).

On the other hand, in step S714, the CPU 111 invokes the file browsing function provided by the OS with a setting for displaying the cloud document provider. Here, the cooperation application 310 issues the explicit intent to the intent for invoking the SAF selection user interface without setting the argument illustrated on Line 9 in FIG. 10A. Therefore, the OS 300 shifts the screen displayed on the operating unit 116 to the selection user interface screen 901 based on the setting for the intent.

If it is determined in advance through the processing in steps S712 to S714 that it is not accessible to the Internet, the selection user interface not including the cloud document provider can be displayed.

In step S715, the cooperation application 310 judges whether a result has been received from the activity of the selection user interface started in step S713 or S714. If a result has been received from the activity of the selection user interface, the processing moves to step S716. If not, a response indicating a result from the activity of the selection user interface is waited.

In S716, the cooperation application 310 receives data indicating the result of the activity and performs an error check based on the received data. The error check is performed for checking whether an upper limit number of files that can be handled by the cooperation application in one operation has been exceeded. If the error check results in OK, the processing moves to step S718. If the error check results in NG, the processing moves to step S717. In step S717, the cooperation application 310 displays an error dialog, not illustrated, on the operating unit 116. In response to a user operation for closing the error dialog, the cooperation application 310 changes the screen displayed on the operating unit 116 to the top menu screen 501, and the processing ends.

On the other hand, in step S718, the cooperation application 310 obtains the selected file by using the file browsing function of the OS. More specifically, a URI stored in the file list received from the selection user interface activity as a result is used to obtain the file. If the file obtaining completes, the preview processing and print processing in step S708 and subsequent steps is performed.

For selecting a file to be used for transmission to an image processing apparatus, the first embodiment, as described above, provides two selection methods including a method for selecting by using the file browsing function of an OS and a method for selecting through a file selection screen implemented within the cooperation application. Therefore, the file selection method provided by the cooperation application can provide a mechanism for quickly accessing a folder storing a file frequently used by the application. The folder may function as a predefined storage for a function of the cooperation application 310 such as the cooperated scan function and the capture function. Thus, a user can easily access a folder highly possibly storing data obtained by the cooperated scan function or data obtained by the capture function. This can promote reuse of a file stored by the cooperation application.

On the other hand, according to the selection method using the file browsing function of the OS, a file to be used for transmission can be selected from files within a memory card and a recently used file by using the selection user interface provided by the OS. When the selection method using the file browsing function of the OS is applied, access to the cloud storage service is also allowed. When the selection method using the file browsing function of the OS is applied, whether a display item for accessing a file in a cloud storage service is to be displayed or not may be judged based on whether it is accessible to the Internet or not. Through the processing, the communication terminal 102 can hide a display item for the cloud storage service which results in a communication error in a state that it is not accessible to the Internet. For example, when the communication terminal 102 is connected to an AP that is not accessible to the Internet for cooperation with the MFP 101, a display item for a cloud storage service can be hid. Hiding unusable display items in advance can improve user convenience.

According to this embodiment, it is configured that access to a memory card can be executed by using the file browsing function of the OS 300. This can eliminate the necessity for implementing a module for accessing a cloud storage or an external memory card, which can suppress labor and cost for design. A specific mechanism can further be provided for selecting a file by the file browsing function of the OS 300. Thus, even when the procedure for accessing a cloud storage or an external memory card is updated, the OS 300 can absorb the resulting difference. This advantageously can suppress an increase of maintenance cost on the cooperation application.

Second Embodiment

Next, a second embodiment of the present disclosure will be described. The second embodiment is a variation example of the first embodiment. The cooperation application 310 according to the second embodiment further includes a function for printing a received electronic mail (or e-mail) and a function for printing a Web page.

The second embodiment assumes the same hardware configuration of an apparatus as that of the first embodiment. Any repetitive detail descriptions on the same configuration as that of the first embodiment will be omitted.

FIG. 12 illustrates example screens relating to a print function according to the second embodiment to be displayed on the operating unit 116.

A top menu screen 1201 is to be displayed instead of the top menu screen 501 according to the first embodiment. The top menu screen 1201 is different from the screen 501 in that a PRINT key 1202 is displayed instead of the DOCUMENT key 504. According to the second embodiment, the cooperation application 310 can print a received e-mail or a Web page. In view of this, according to the second embodiment, a key labeled as "PRINT" is displayed instead of the key labeled as "DOCUMENT".

If a PRINT key 1202 is selected, the communication terminal 102 changes the screen displayed on the operating unit 116 to a PRINT screen 1211. The PRINT screen 1211 display keys 1212 to 1215. A user may select one of the keys to execute a desired print function. An ALBUM key 1212 is usable for selecting and printing a photograph from an album. A FOLDER key 1213 is usable for selecting and printing a file from a folder. A WEB PAGE key 1214 is usable for printing a Web page. An E-MAIL key 1215 is usable for printing a body of an e-mail or an attached file.

If the FOLDER key 1213 is selected, the communication terminal 102 changes the screen displayed on the operating unit 116 to a folder selection screen 1221 or 1231. The folder selection screen 1221 is to be displayed instead of the DOCUMENT screen 511 according to the first embodiment. The folder selection screen 1231 is to be displayed instead of the DOCUMENT screen 521 according to the first embodiment. The screen 1231 is an example screen to be display when the OS 300 is of a version not supporting the file browsing function. If the OS 300 runs on an OS of a version not supporting an SAF, the cooperation application 310 displays a DOCUMENT screen not including a key for selecting the file browsing function provided by the OS. A FOLDER WITHIN APP key 1222 is usable for opening a folder within the application as a current folder and selecting a file. The key 1222 provides the same function as that corresponding to the LOCAL key 512 according to the first embodiment. A FOLDER WITHIN TERMINAL key 1223 is usable for opening a root folder in the storage 114 within the communication terminal 102 as a current folder and selecting a file. A PRINT EXTERNAL DATA key 1224 is usable for selecting a file by using the file browsing function provided by the OS. The key 1224 provides the same function as that corresponding to the PRINT EXTERNAL DATA key 513 according to the first embodiment.

According to the second embodiment, printing of a Web page and printing of a body and an attached file of an e-mail can be performed in addition to the function for selecting and printing a file according to the first embodiment. According to the second embodiment, data to be requested to be printed (such as an image, a Web page, an e-mail, and a file stored in a folder) can be determined on the screen 1211. When a user's request to print a file stored in a folder is confirmed, the screen 1221 or the screen 1231 is displayed which presents methods for selecting methods for selecting a file.

Figure 13:
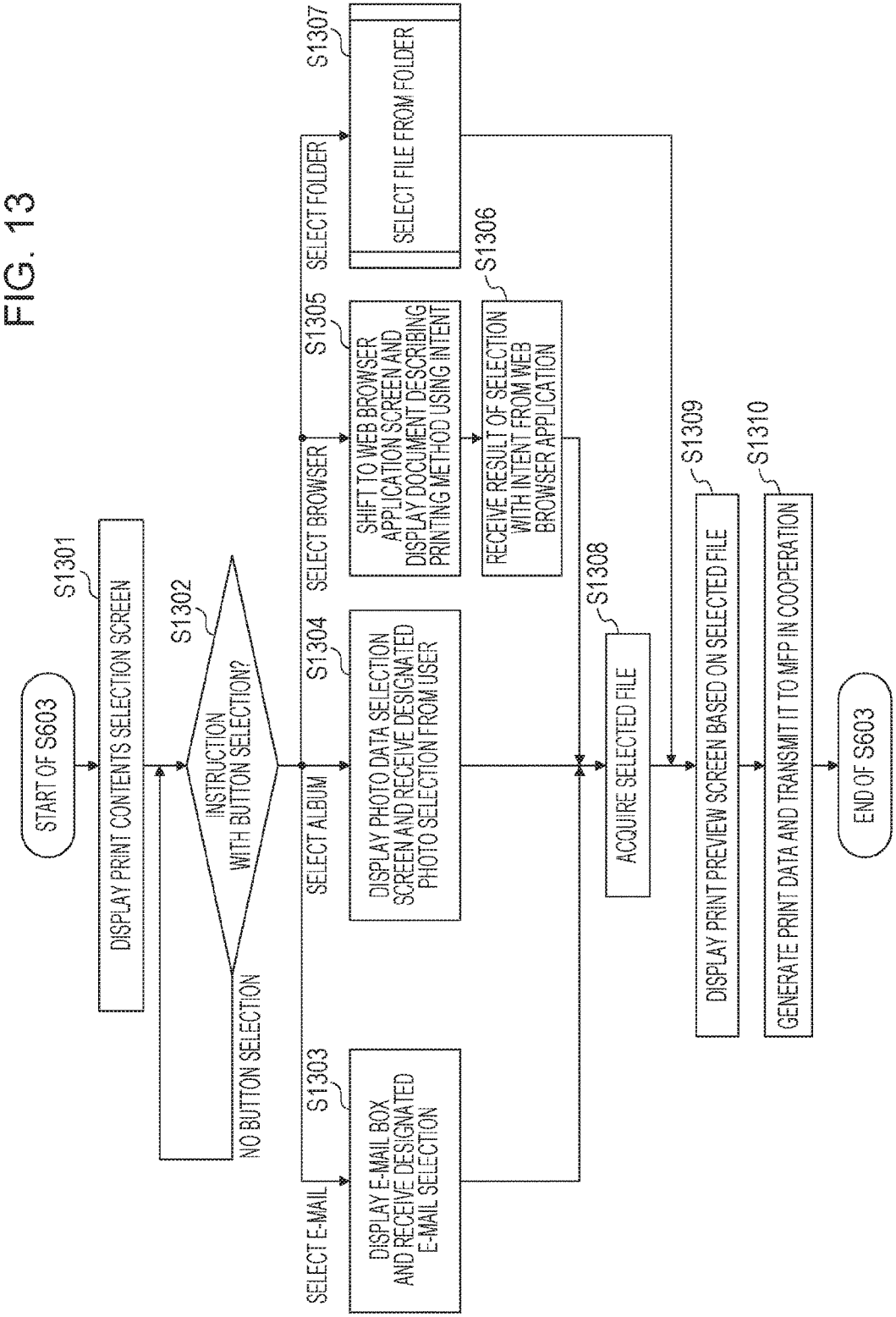
FIG. 13 is an example flowchart illustrating a control in the communication terminal.
Figure 14:
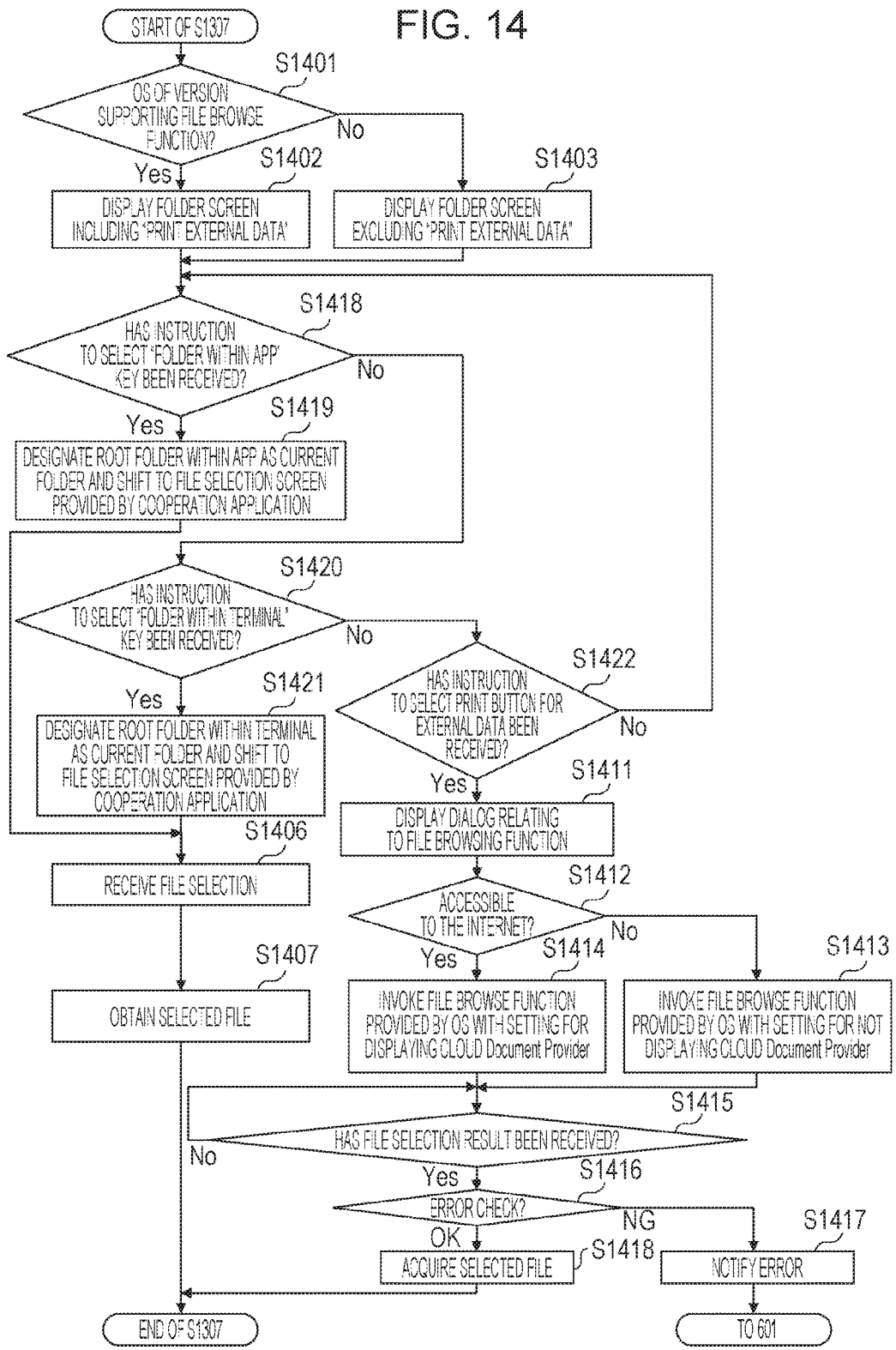
FIG. 14 is an example flowchart illustrating a control in the communication terminal.

Next, a specific control for print processing in a case where the PRINT key 1202 is selected will be described with reference to flowcharts in FIGS. 13 and 14. FIGS. 13 and 14 are flowcharts illustrating controls to be executed in the communication terminal 102. FIG. 13 is a flowchart illustrating processing to be executed instead of the print processing illustrated in FIG. 7 according to the first embodiment.

Operations (steps) illustrated in the flowcharts in FIGS. 13 and 14 may be implemented by a program for implementing control modules, which is stored in the ROM 112 or the storage 114, read out therefrom to the RAM 113 and executed by the CPU 111. The processing illustrated in the flowcharts are implemented by the cooperation application 310, which is the subject, in cooperation with the OS 300, which is a control program. In order to clearly describe the control program that is the subject causing operations, the operations will be described as being performed subjectively by the OS 300 or the cooperation application 310.

Referring to FIG. 13, in step S1301, the CPU 111 displays a screen for specifying print data. The screen specifying print data may be a PRINT screen 1211 illustrated in FIG. 12, for example.

In step S1302, the CPU 111 determines processing for shifting to the next operation based on the receipt state of a key selection instruction. If a key selection is not received, processing for waiting for a selection of one key performed by a user is performed. If a selection of the E-MAIL key 1215 is received, the processing moves to step S1303. If a selection of the ALBUM key 1212 is received, the processing moves to step S1304. If a selection of the WEB PAGE key 1214 is received, the processing moves to step S1305. If a selection of the FOLDER key 1213 is received, the processing moves to step S1307.

In step S1303, the CPU 111 displays an e-mail box, not illustrated, and receives an instruction to select an e-mail. Settings such as an e-mail server and an e-mail address for receiving an e-mail are predefined in the cooperation application 310. The CPU 111 in response to a selection of an e-mail generates data indicating an e-mail body or data indicating an attached file to be used for printing, and the processing moves to step S1308.

In step S1304, the cooperation application 310 starts a browsing application activity for browsing an image by using an explicit intent. The OS 300 displays a browsing application screen for browsing an image and receives a selection of an image from a user. If the cooperation application 310 receives a result of an image selection, the processing moves to step S1308. With the function, a user clearly requesting to print an image can select an image file by using a management application that the user is usually accustomed to use.

In step S1305, the cooperation application 310 starts a Web browser application by using the intent. In this case, the cooperation application 310 designates to display a document describing a print method using the cooperation application 310 as an initial page of the Web browser application. With this function, the method for printing from a Web browser can be notified to a user. In step S1306, the CPU 111 receives a result of a selection by an implicit intent from the Web browser application. The processing then moves to step S1308.

In step S1308, the CPU 111 obtains a file selected by the processing in step S1303, S1304, or S1306. The processing then moves to step S1309. If the CPU 111 receives a selection of an e-mail in step S1303, the data generated by the processing in step S1303 is obtained.

On the other hand, in step S1307, the CPU 111 executes processing for selecting a file from a folder. The processing to be performed in step S1307 will be described with reference to the flowchart in FIG. 14.

Referring to FIG. 14, in step S1401, the CPU 111 judges whether the OS is of a version supporting the file browsing function or not, like the processing in step S701. If the CPU 111 judges that the OS is of a version supporting the file browsing function, the processing moves to step S1402. If not, the processing moves to step S1403.

In step S1402, the CPU 111 displays a folder selection screen including "PRINT EXTERNAL DATA". On the other hand, in step S1403, the CPU 111 displays a folder selection screen not including "PRINT EXTERNAL DATA".

In step S1418, the CPU 111 judges whether an instruction to select the FOLDER WITHIN APP key has been received or not. If the instruction to select the FOLDER WITHIN APP key has been received, the processing moves to step S1419. If not, the processing moves to step S1420.

In step S1419, the cooperation application 310 designates a folder within the application as a current folder and invokes a file selection screen provided by the cooperation application 310. The folder within the application may be a predetermined folder to be used as a predefined storage destination for the cooperated scan function or the capture function, for example. If the display of the selection screen for selecting a file within a predetermined folder completes, the processing moves to step S1406.

On the other hand, in step S1420, the CPU 111 judges whether an instruction to select the FOLDER WITHIN TERMINAL key has been received or not. If the instruction to select the FOLDER WITHIN TERMINAL key has been received, the processing moves to step S1421. If not, the processing moves to step S1422. In step S1421, the cooperation application 310 designates a root folder within the terminal as a current folder and invokes the file selection screen provided by the cooperation application 310. If the display of the selection screen for selecting a file within the root folder completes, the processing moves to step S1406.

In step S1422, the CPU 111 judges whether a selection of the PRINT EXTERNAL DATA key has been received or not. If a selection of the PRINT EXTERNAL DATA key has been received, the processing moves to step S1411. If not, the processing returns to step S1418 where the processing waits for a user operation.

Because the processing for a file selection by the file browsing function provided by the OS 300 in steps S1411 to S1418 is the same as the processing in steps S711 to S718 according to the first embodiment, any repetitive description will be omitted. If the CPU 111 obtains the file by using the file browsing function provided by the OS 300 through the processing in steps S1411 to S1418, the processing moves to step S1309.

Because the processing in steps S1406 and S1407 is the same as the processing in steps S706 and S707, any repetitive detail descriptions will be omitted. When a selection of a file is received through the file selection screen provided by the cooperation application 310 and the file obtaining completes, the processing moves to step S1309.

Referring back to FIG. 13, in step S1309, the CPU 111 displays a PRINT PREVIEW screen based on the selected file. In step S1310, the CPU 111 generates print data for printing the file based on the selected file and transmits it to the MFP 101. The processing in step S1309 is the same as the processing in step S708 according to the first embodiment, and the processing in step S1310 is the same as the processing in step S709 according to the first embodiment.

According to the second embodiment, as described above, a file to be used for printing can be selected appropriately also in a cooperation application including a print function for a received e-mail and a function for printing a Web page.

According to the aforementioned embodiments, in a communication terminal in communication with an image processing apparatus, a plurality of selection methods can be selected for selecting data to be transmitted to the cooperated image processing apparatus for improved user convenience relating to the file selection. In addition, the aforementioned embodiments can reduce cost relating to design and maintenance of an application can be reduced and, at the same time, can improve user convenience for selecting data to be transmitted to the cooperated image processing apparatus.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-120749 filed Jun. 20, 2017, which is hereby incorporated by reference herein in its entirety.

What is claimed is:

1. A control method performed by an application executing on a communication terminal that includes an OS (operating system) and that communicably connects the communication terminal to an image processing apparatus, the method comprising:
    displaying, on an operating unit of the communication terminal in response to a user operation for file selection, a selection screen that includes at least first and second display items, wherein the first display item is used for displaying a first screen for a first file selection function provided by the application different from the OS, and wherein the second display item is used for displaying a second screen for a second file selection function provided by the OS;
    in response to an instruction to select the first display item received through the selection screen, displaying the first screen for selecting a file within a predetermined folder of the communication terminal by using the first file selection function provided by the application different from the OS; and
    in response to an instruction to select the second display item through the selection screen, invoking the second file selection function provided by the OS to display the second screen provided by the OS; and
    transmitting data based on at least one file, that is selected through the displayed first screen and/or the displayed second screen, to the image processing apparatus.

2. The control method according to claim 1, further comprising:
    displaying, by the application, a preview screen for data to be transmitted to the image processing apparatus based on the selected at least one file,
    wherein, in the transmitting, by the application transmits the data based on the selected at least one file to the image processing apparatus in response to a transmission instruction received through the preview screen.

3. The control method according to claim 1, wherein, in response to the instruction to select the second display item through the selection screen, the application invokes the second file selection function provided by the OS with an explicit intent to display the second screen.

4. The control method according to claim 3, further comprising:
    judging, by the application, whether the communication terminal is accessible to the Internet,
    wherein, in a case where it is judged that the communication terminal is not accessible to the Internet, the application invokes the second file selection function provided the OS with the intent that designates an argument indicating that a file directly accessible on the communication terminal is to be returned instead of downloading from a cloud service.

5. The control method according to claim 4, wherein, in a case where the second file selection function provided by the OS is invoked by the intent having the designated argument, the OS controls to display the second screen not including a display item for accessing a content provided by a document provider of a cloud service,
    and wherein, in a case where the second file selection function provided by the OS is invoked by an intent not having the designated argument, the OS controls to display the second screen including a display item for accessing a content provided by the document provider of the cloud service.

6. The control method according to claim 1,
further comprising:
    obtaining, by the application, an image by using a camera included in the communication terminal, and the predetermined folder is used as a predefined storage destination of the obtained image.

7. The control method according to claim 1,
    wherein the image processing apparatus is a printer, and wherein print data generated based on the determined file is transmitted to the printer.

8. A non-transitory computer-readable storage medium storing a computer-executable program for causing a computer to execute a method for controlling a communication terminal including an OS (operating system) running thereon, the method comprising:
    displaying, on an operating unit of the communication terminal, a selection screen for prompting a user to select a file selection method to be used for data transmission to the image processing apparatus in response to a user operation for selecting a file, wherein the selection screen includes at least first and second display items for selecting a file selection method;
    in response to an instruction to select the first display item received through the selection screen, displaying a first file selection screen for a file selection function provided by an application different from the OS;
    invoking the file selection function provided by the OS to display a second file selection screen in response to an instruction to select the second display item through the selection screen;
    determining a file to be processed, wherein a file selected through the first file selection screen provided by the application is determined as the file to be processed in a case where the file is selected through the first file selection screen, and wherein a file selected through the second file selection screen provided by the OS based on the invoking is determined as the file to be processed in a case where the file is selected through the second file selection screen; and
    transmitting data based on the determined file to the image processing apparatus.

9. The non-transitory storage medium according to claim 8, wherein the program is an application program installable in the communication terminal, and the file selection function provided by the application different from the OS is a file selection function provided by the application program.

10. The non-transitory storage medium according to claim 9, further comprising:
displaying, by the application program, a preview screen for data to be transmitted to the image processing apparatus based on the determined file; and
transmitting, by the application program the data based on the determined file to the image processing apparatus in response to a transmission instruction received through the preview screen.

11. The non-transitory storage medium according to claim 9, wherein the application program invokes the file selection function provided by the OS by using an explicit intent.

12. The non-transitory storage medium according to claim 11,
further comprising:
judging, by the application program, whether the communication terminal is accessible to the Internet, and
designating, by the application program, in the intent an argument indicating that a file directly accessible on the communication terminal is to be returned instead of downloading from a cloud service in accordance with a result of judgment that the communication terminal is not accessible to the Internet in order to invoke the file selection function provided by the OS and invokes the file selection function provided by the OS.

13. The non-transitory storage medium according to claim 12, wherein, in the file selection function provided by the OS invoked by the application program, in a case where the file selection function provided by the OS is invoked based on the intent having the designated argument, the OS controls to display a file selection screen not including a display item for accessing a content provided by a document provider of a cloud service on the screen of the file selection function and, in a case where the file selection function provided by the OS is invoked based on an intent not having the designated argument, the OS controls to display a file selection screen including a display item for accessing a content provided by the document provider of the cloud service.

14. The non-transitory storage medium according to claim 8, wherein, in order to invoke the file selection function provided by the OS, the displaying displays a dialog for displaying information regarding display of a memory card.

15. The non-transitory storage medium according to claim 9, wherein the first file selection screen of the file selection function provided by the application program to be displayed in response to the instruction to select the first display item is a screen for selecting a file within a predetermined folder within a storage of the communication terminal.

16. The non-transitory storage medium according to claim 9, further comprising:
obtaining, by the application program, an image by using a camera included in the communication terminal, and wherein the predetermined folder is used as a predefined storage destination of the obtained image.

17. The non-transitory storage medium according to claim 8,
wherein the image processing apparatus is a printer, and wherein the print data generated based on the file is transmitted to the printer.

18. The non-transitory storage medium according to claim 9, further comprising:
obtaining, by the application program, a version of the OS, and displaying the selection screen not including the second display item in a case where the obtained version does not satisfy a predetermined condition.

* * * * *